No. 661,783. Patented Nov. 13, 1900.
G. H. ALLAN & S. H. LACKLAND.
ROLLER TRUCK.
(Application filed Apr. 30, 1900.)
(No Model.)
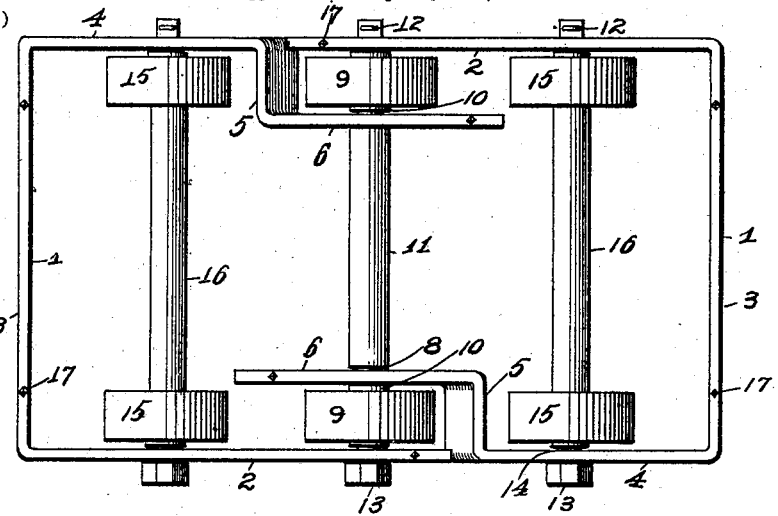
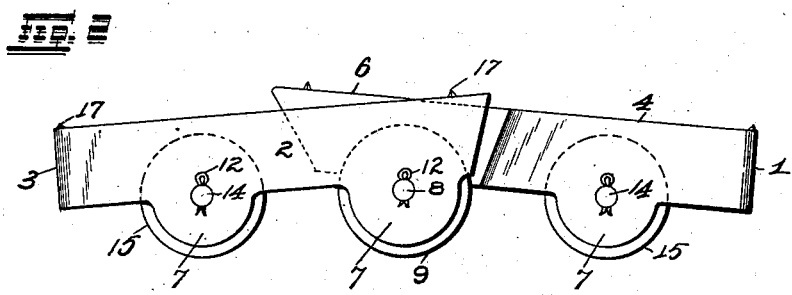
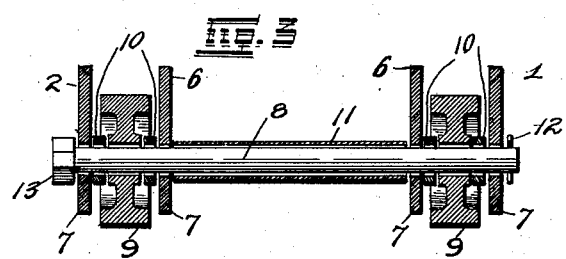
WITNESSES:
INVENTORS.
George H. Allan,
Samuel H. Lackland,
By Higdon & Longan ATTORNEYS.
THE NORRIS PETERS CO., PHOTO-LITHO., WASHINGTON, D. C.

UNITED STATES PATENT OFFICE.

GEORGE H. ALLAN AND SAMUEL H. LACKLAND, OF ST. LOUIS, MISSOURI; SAID LACKLAND ASSIGNOR TO SAID ALLAN.

ROLLER-TRUCK.

SPECIFICATION forming part of Letters Patent No. 661,783, dated November 13, 1900.

Application filed April 30, 1900. Serial No. 14,963. (No model.)

*To all whom it may concern:*

Be it known that we, GEORGE H. ALLAN and SAMUEL H. LACKLAND, of the city of St. Louis, in the State of Missouri, have invented certain new and useful Improvements in Roller-Trucks, of which the following is a full, clear, and exact description, reference being had to the accompanying drawings, forming a part hereof.

This invention relates to trucks; and it consists of the novel construction, combination, and arrangement of parts hereinafter shown, described, and claimed.

Figure 1 is a top plan view showing our complete invention. Fig. 2 is a side elevation. Fig. 3 is a sectional view showing the arrangement of the different parts.

In the construction of this invention, as shown, we provide a framework 1 of two parts, the said parts being identical in construction. Each of said parts comprises a straight side member 2, an end member 3 at right angles to the side member, and a second side member 4, parallel with the first-mentioned side member, but which is bent inwardly midway of its length, as indicated by 5, and is provided with an integral projecting portion 6, which is a slight distance longer than is the side member 2, the purpose of which arrangement is hereinafter set forth. Integral with the lower side of each of the said members comprising the framework is a plurality of projections 7, the purpose of which is to form bearings for the axial bolts which support the rollers or wheels upon which the frame is mounted. As shown, the end of the side 2 on one member of the frame is arranged adjacent to and parallel with the projecting portion 6 of the opposite frame, Fig. 1. The two members of the frame are held in this adjustment by means of an axial bolt or rod 8, upon which is carried a pair of wheels or rollers 9, one of said rollers being near each side of the framework and being mounted between the projections 6 and the members 2. To each side of each of the wheels may be placed a washer 10, which serve to hold the side of the wheel out of contact with the members 6 and 2. The sleeve 11, secured upon the bolt 8 between the opposite projections 6, serves to hold the parts better in position. The said bolt is prevented from displacement by any well-known means—such, for example, as by a cotter-pin 12 and by the integral head 13.

Supported in the bearings formed in the integral portions 7 near the end of the framework formed by the two members above described is an axial bolt 14, and carried on each of the said axial bolts is a pair of wheels or rollers 15, the said rollers being disposed as shown in Fig. 1. The wheels 15 are somewhat smaller than are the wheels 9 and are held in the proper adjustment by sleeves 16, similar in all respects to the sleeve 11. Since the wheels 9 are larger than the wheels 15, the middle of the framework formed by the two members will necessarily be supported higher than the ends, which will cause the ends of the side members to project higher than the remaining portion of the framework, which position is best shown in Fig. 2. This makes the axial bolt 8 a pivot for the two members composing the framework, and this feature constitutes an essential element of our invention. By this arrangement when the projecting ends of the side members are depressed the outer ends will be raised, thereby causing most or all the weight of the object which is mounted on the truck to be supported on the axial bolt 8. This allows the direction of the movement of the truck to be easily changed at will, which would not be possible were an equal amount of the weight supported by the end wheels. The advantage of this is manifest and requires no further explanation. The said projecting ends will be depressed whenever any object of any weight is mounted on the truck, thereby making the weight of the object subserve the important function of making the device easily operated. Integral with the upper side of the frame at suitable intervals are pointed lugs 17, which engage with the object on the truck and hold the same in position thereon. The advantage of having the members comprising the framework of the truck similar in construction is that one pattern suffices for making the framework, which reduces the cost of construction and at the same time enhances the general value of the device.

A truck constructed as above described possesses superior advantages in that it is unnecessary to tilt the same up when it is desired to place an object thereon. It possesses an advantage over the ordinary three or four wheeled truck in the facility with which the direction of the movement may be governed. The cost involved in its construction is not greater than is involved in the construction of the trucks of ordinary construction.

We claim—

1. A truck, comprising a frame formed with a plurality of parts pivotally secured together, traction-wheels for supporting said frame, and means whereby certain of said wheels are elevated whenever an object is mounted on the framework, substantially as specified.

2. A truck comprising a frame formed with a plurality of parts pivotally secured together, axial bolts carried by said framework, traction-wheels carried upon said axial bolts, and means whereby certain of said wheels are elevated by the weight of the object mounted upon the framework, substantially as specified.

3. A truck comprising a frame formed with a plurality of parts, projecting portions carried by said framework, traction-wheels for supporting said framework and means whereby certain of said traction-wheels are elevated when any object is mounted on said framework, substantially as specified.

4. A truck comprising a framework, means whereby an object will be retained on said framework, traction-wheels for supporting said framework, means whereby all of said traction-wheels will rest upon the surface when the device is not in use, and means whereby certain of said wheels will be elevated when any object is mounted upon the framework, substantially as specified.

5. A truck comprising a framework, traction-wheels for supporting said framework, means for allowing all of said traction-wheels to move upon the surface, and means for elevating certain of said traction-wheels when the device is in use, substantially as specified.

In testimony whereof we affix our signatures in presence of two witnesses.

GEORGE H. ALLAN.
SAMUEL H. LACKLAND.

Witnesses:
EDWARD E. LONGAN,
JOHN D. RIPPEY.